No. 862,865. PATENTED AUG. 6, 1907.
G. A. CRAM.
VEGETABLE AND FRUIT PICKER TABLE.
APPLICATION FILED OCT. 11, 1906.
2 SHEETS—SHEET 1.
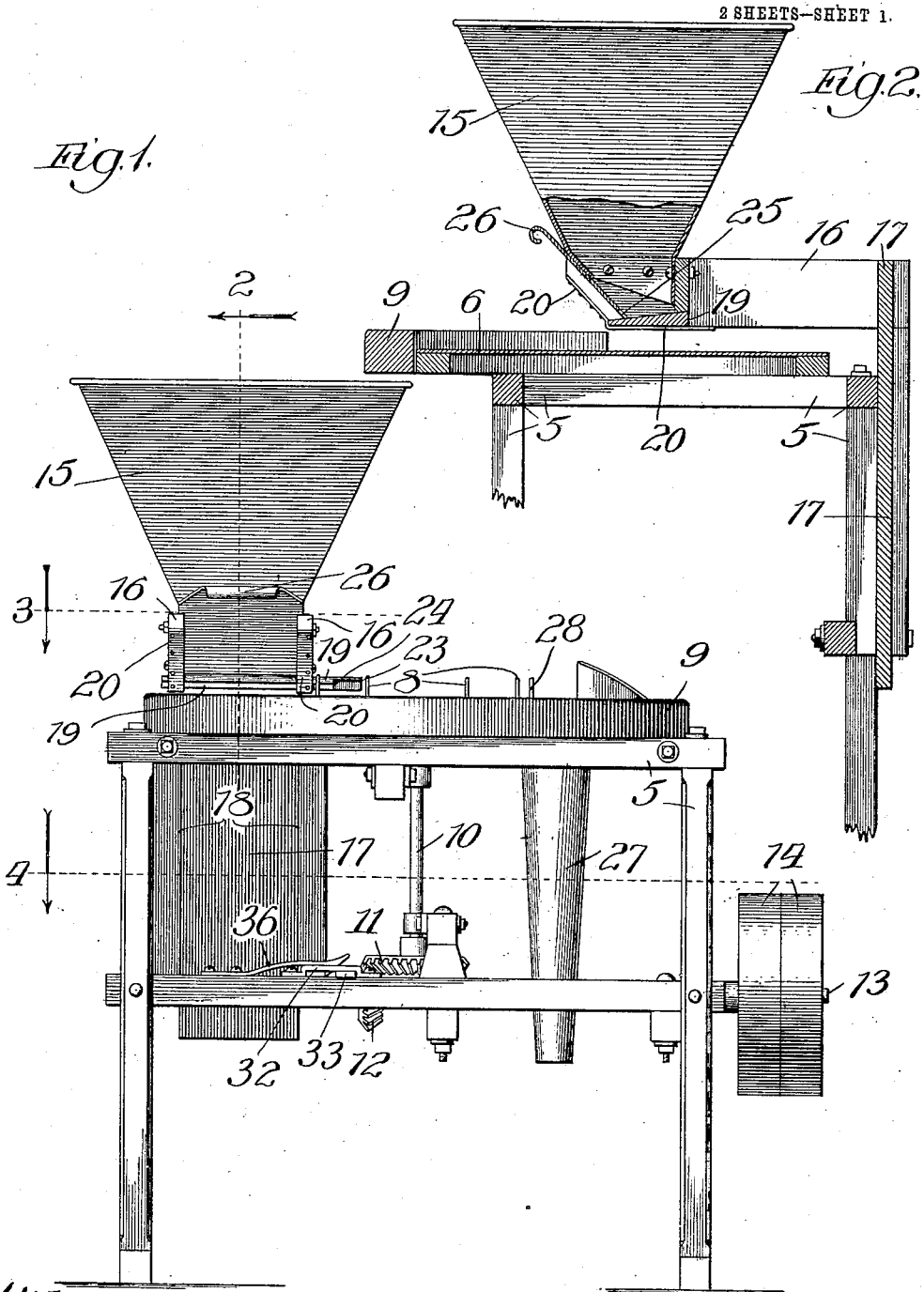
Witnesses:
Inventor:
George A. Cram, No. 862,865. PATENTED AUG. 6, 1907.
G. A. CRAM.
VEGETABLE AND FRUIT PICKER TABLE.
APPLICATION FILED OCT. 11, 1906.

2 SHEETS—SHEET 2.

Witnesses:
C. C. Gaylord.
John Enders.

Inventor:
George A. Cram,
By Dyrenforth, Dyrenforth, Lee & Wiles,
Attys.

THE NORRIS PETERS CO., WASHINGTON, D. C.

UNITED STATES PATENT OFFICE.

GEORGE A. CRAM, OF RANDOLPH, WISCONSIN.

VEGETABLE AND FRUIT PICKER-TABLE.

No. 862,865.  Specification of Letters Patent.  Patented Aug. 6, 1907.

Application filed October 11, 1906. Serial No. 338,384.

*To all whom it may concern:*

Be it known that I, GEORGE A. CRAM, a citizen of the United States, residing at Randolph, in the county of Columbia and State of Wisconsin, have invented a new and useful Improvement in Vegetable and Fruit Picker-Tables, of which the following is a specification.

The object of my invention is to provide a novel construction of picker-table of the class employed for preparing small vegetables, such as green peas, beans and the like, and small fruits, such as strawberries, cherries, huckleberries and the like, for treatment before canning them, by feeding them to a traveling table on which an attendant spreads them to facilitate picking out imperfect ones and foreign matter, such as pieces of leaf and pod, and stems.

Figure 3:
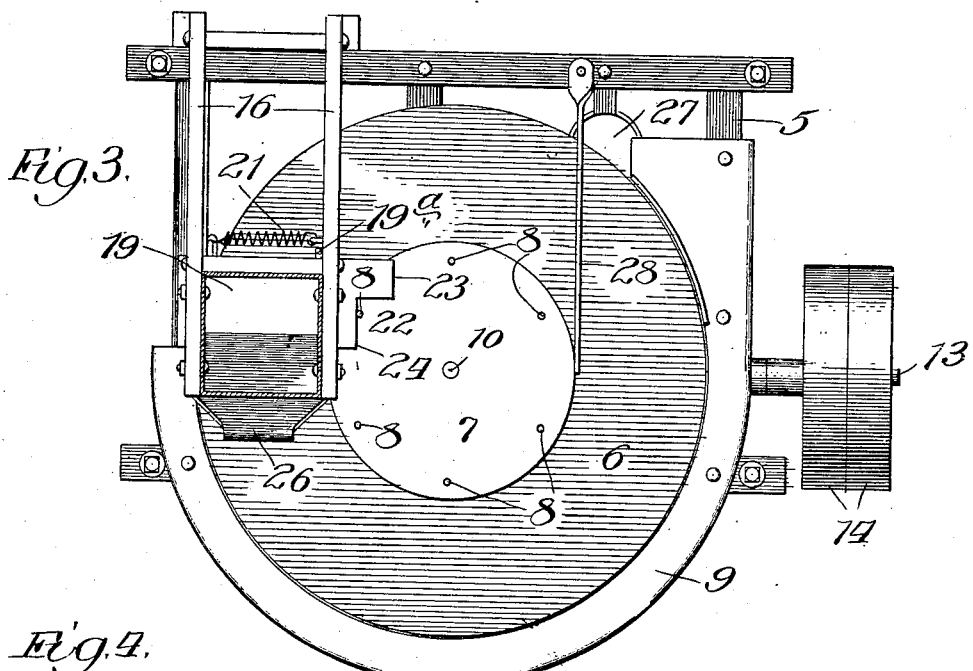
Figure 4:
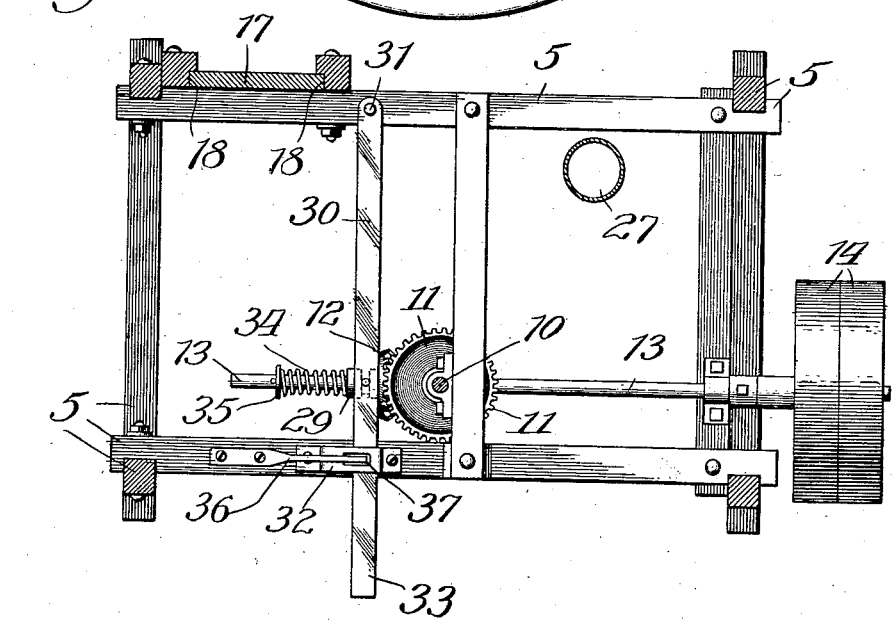

Referring to the accompanying drawings—Figure 1 is a view of my improved machine in side elevation; Fig. 2, a broken section taken at the line 2 on Fig. 1 and viewed in the direction of the arrow; Fig. 3, a plan section taken at the line 3 on Fig. 1 and viewed in the direction of the arrow, and Fig. 4, a plan section taken at the line 4 on Fig. 1 and viewed in the direction of the arrow.

On a suitable frame 5 is rotatably mounted in horizontal position a circular table-top 6, which may be formed of sheet-metal or other suitable material, and which is shown to be provided with a central circular boss 7 having pins 8 projecting upward from it at intervals near its periphery. The rotary table is part way surrounded by a rim 9, which may be of wood, rigidly secured on the top of the frame and, like the boss 7, projecting upward beyond the surface of the table to form about the latter, with the circumferential edge of the boss, a depressed surface. The table is carried by a vertical central shaft 10 journaled in suitable bearings on the frame and provided on its lower end with a beveled gear-wheel 11 adapted to mesh with a beveled pinion 12 on the rotary horizontal drive-shaft 13, also suitably journaled on the frame 5, and which is shown to be provided with belt-pulleys 14, adapted to be geared with any desired driving power (not shown). A hopper 15 is supported to discharge from its lower end on the depressed surface of the table. As shown, this hopper is fastened between the forward ends of parallel bars forming a sub-frame 16 and connected at their opposite ends by a vertical bar 17 adapted to be confined in parallel vertical guides 18 provided on the frame 5. By this preferred construction of the hopper-supporting means, the hopper may be readily applied to and removed from the machine, or raised and lowered to put the machine into or out of operation. The open base of the hopper is covered by a bottom 19, preferably tapering toward its forward edge, as shown, and supported, to adapt it to be reciprocated longitudinally by straps 20 secured to the lower edges of the members of the sub-frame 16 to extend transversely across the movable bottom near its ends and there afford a seat for it. A coiled spring 21 is fastened at one end to a side-bar of the sub-frame 16 and at its opposite end to the adjacent wider rear edge of the bottom 19, the inner end of which terminates in a recess 22 of the preferred rectangular shape shown in Fig. 3 to afford an advance end 23 and an offset end 24 extending, under the tension of the spring 21, into the path of the circular series of pins 8. The forward oblique side of the hopper is provided, adjacent to the movable bottom 19, with a discharge-opening 25, to cover which a valve 26 is provided to slide adjustably in guides provided in the sub-frame 16 for the purpose of raising and lowering the valve to increase or decrease the size of the hopper discharge opening.

At the discharge end of the rotatory table is supported on the frame a chute 27, adjacent to which a deflector-arm 28 is pivoted at one end to the frame to bear at its opposite end against the boss 7.

The operation is as follows: Rotation of the shaft 13 by its gear-connection with the shaft 10 rotates the table 6. In rotating, each pin 8 in describing the arc of its rotation past the adjacent end of the bottom 19, first engages, by a cam-like action, the end 23, thereby forcing the bottom out of its path against the tension of the spring 21, until the pin clears that end, whereupon the recoil-force of the spring shoots the bottom in the direction to bring its end 24 against said pin, which, in completing said arc, exerts a cam-like action against that end to force the bottom in the direction against the resistance of the spring 21 until the pin clears the bottom, when the latter again shoots forward under the recoil-force of its controlling spring, bringing its ends 23, 24 into position to be acted against, in the same manner, by the next succeeding pin. Thus, each time a pin 8 passes the adjacent recessed end of the bottom 19, it forcibly jogs the latter twice, according to the construction represented, which, however, may be such as to cause each pin to jog the bottom, in clearing its end, only once by providing the spring-pressed end without any recess, or more than twice by increasing the number of the recesses 22. The movement of the bottom 19 in the direction toward the pins 8 is limited by a stop 19ª. The effect of the described jogging action on the movable bottom 19 is to shake the contents of the hopper in successive batches through its discharge-opening upon the rotating table, with the result of spreading each batch upon the table and thus facilitating the operation of picking out foreign matter and imperfect fruit or vegetables, thus avoiding all necessity on the part of the attendant for performing the spreading operation by hand, which is objectionable because tending to mash the material to be picked over, and which objection is entirely avoided by the use of my improved machine.

The surface of the rotating table is sufficient, at the speed of rotation observed, to afford to the attendant, or attendants, ample time to pick clean each batch of the material in its course from the hopper to the discharge from the table into the chute 27, to which it is guided by the arm 28.

It is intended that a series of my improved picker-tables shall be on one sufficiently long shaft 13, which would then carry a plurality of pinions 12, each to mesh with the gear 11 of a different table in the series. It is desirable, particularly when a number of the tables are thus arranged to be operated by the one shaft 13, that it may be readily reduced to an inoperative condition, or put out of commission. To that end, I provide the pinion 12 with a collar 29 feathered to the shaft 13 and connected with a lever 30 fulcrumed at 31 on the rear of the frame to project through a guide-loop 32 on the front-rail of the frame beyond the latter and afford a handle 33. A spiral spring 34, surrounding the shaft 13, is confined against the collar 29 by an abutment 35 on the shaft. Whenever it is desired to put the machine out of commission, the lever 30 is turned, at its handle 33, in the direction to withdraw the pinion 12 from the adjacent gear 11 against the resistance of the spring 34; and to hold the pinion in its disengaged position, I provide a spring-catch 36, past which the lever is turned in effecting the withdrawal and which works through a slot 37 in the strap 32 to obstruct the return of the lever. When it is desired to again put the machine into operative condition, the catch 36 is raised to release the lever, whereupon the spring 34 returns it to the normal position in which the pinion meshes with the gear.

The more important feature of my improvement relates to jogging the material out of the hopper to effect, automatically, spreading thereof on a traveling conveyer, which need not be the rotary table shown and described, though the latter is the preferred form of conveyer.

What I claim as new, and desire to secure by Letters Patent, is—

1. In combination with a conveyer, a hopper provided with a laterally-discharging outlet over said conveyer, guides on the bottom side of said hopper at its opposite sides, a bottom for said hopper reciprocably mounted in said guides, and means on said conveyer constructed and arranged to actuate said hopper-bottom.

2. In combination with a conveyer carrying a series of pins, a hopper provided with a laterally-discharging outlet over said conveyer, guides on the bottom side of said hopper at its opposite sides, and a spring-pressed bottom for said hopper reciprocably mounted in said guides and projecting into the path of said pins to be actuated by them in the movement of the conveyer.

3. In combination, a hopper provided with a laterally-discharging outlet, guides on the bottom side of said hopper, a bottom for said hopper reciprocably mounted in said guides, a coiled spring secured at one end to said hopper and at its opposite end to said bottom, and means for moving said bottom against the tension of said spring.

4. In a machine of the character described, the combination of a rotatory table provided with a central boss carrying a circular series of pins, a raised rim about said table, a hopper having a discharge-opening and supported to discharge upon said table, and a spring-pressed reciprocable bottom for said hopper projecting into the path of said pins to be actuated by them in the rotation of said table, for the purpose set forth.

5. In a machine of the character described, the combination with a frame, of a circular table rotatably supported on said frame and provided with a central boss, a circular series of pins projecting from said boss, a hopper having a discharge-opening and supported on said frame to discharge upon said table, and a spring-pressed reciprocable bottom for said hopper having a recessed end at which it projects into the path of said pins to be actuated by them in the rotation of the table, for the purpose set forth.

6. In a machine of the character described, the combination with a frame, of a circular table rotatably supported on said frame and provided with a central boss, a raised rim about said table, a circular series of pins projecting from said boss, a hopper having a discharge-opening and adjustably supported on said frame to discharge upon said table, and a spring-pressed reciprocable bottom for said hopper having a recessed end at which it projects into the path of said pins to be actuated by them in the rotation of the table, for the purpose set forth.

7. In a machine of the character described, the combination with a frame, of a circular table rotatably supported on said frame and provided with a central boss, a stationary raised rim extending partway about said table, a chute near one end of said rim and a deflector-arm pivoted to said frame to extend against the edge of said boss, a circular series of pins projecting from said boss, a hopper having a discharge-opening and supported on said frame to discharge upon said table, and a spring-pressed reciprocable bottom for said hopper projecting into the path of said pins to be actuated by them in the rotation of the table, for the purpose set forth.

8. In a machine of the character described, the combination with a frame, of a circular table, a vertical rotary shaft journaled on said frame and carrying at its upper end said table and on its lower end a beveled gear, a circular series of pins on said table, a hopper having a discharge-opening and supported on the frame to discharge on said table, a spring-pressed reciprocable bottom for said hopper projecting at one end into the path of said pins to be actuated by them in the rotation of the table, a drive-shaft for the table, a beveled spring-pressed pinion reciprocably supported on said drive-shaft to mesh with said gear, and a lever fulcrumed on said frame and connected with said pinion for moving it.

GEORGE A. CRAM.

In presence of—
J. O. JONES,
C. H. BURBACH.